US012594852B2

(12) United States Patent
Mo et al.

(10) Patent No.: US 12,594,852 B2
(45) Date of Patent: Apr. 7, 2026

(54) BIDIRECTIONAL ENERGY TRANSFER SYSTEM AND METHOD UTILIZING A CORDSET

(71) Applicant: Ford Global Technologies, LLC, Dearborn, MI (US)

(72) Inventors: Richard Mo, Dearborn, MI (US); Timothy Harris, Grosse Ile, MI (US); Ryan J. O'Gorman, Beverly Hills, MI (US); Stuart C. Salter, White Lake, MI (US); Katherine Howard-Cone, Canton, MI (US); Peter Phung, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 1149 days.

(21) Appl. No.: 17/550,216

(22) Filed: Dec. 14, 2021

(65) Prior Publication Data

US 2023/0182614 A1     Jun. 15, 2023

(51) Int. Cl.
| | |
|---|---|
| *B60L 53/18* | (2019.01) |
| *B60L 55/00* | (2019.01) |
| *H02J 7/00* | (2006.01) |
| *H02J 105/12* | (2026.01) |

(52) U.S. Cl.
CPC ............... *B60L 55/00* (2019.02); *B60L 53/18* (2019.02); *H02J 7/865* (2026.01); *B60L 2210/42* (2013.01); *H02J 2105/12* (2026.01); *H02J 2207/20* (2020.01)

(58) Field of Classification Search
CPC ................................. B60L 55/00; B60L 53/18
See application file for complete search history.

(56) References Cited

U.S. PATENT DOCUMENTS

| | | | |
|---|---|---|---|
| 7,960,857 B2 * | 6/2011 | King | |
| 9,566,867 B2 * | 2/2017 | Kydd | |
| 10,857,897 B2 * | 12/2020 | Narla | |
| 2011/0121779 A1 * | 5/2011 | Ichikawa | |
| 2019/0165591 A1 * | 5/2019 | Kisacikoglu et al. | |
| 2020/0031238 A1 * | 1/2020 | Kydd | |
| 2021/0276442 A1 * | 9/2021 | Schroeder et al. | |

FOREIGN PATENT DOCUMENTS

| | | | | |
|---|---|---|---|---|
| CN | 103543409 A | 1/2014 | | |
| CN | 111098733 A | 5/2020 | | |
| CN | 211036585 U | 7/2020 | | |
| DE | 102018217295 A1 * | 4/2020 | ............. | B60L 53/18 |
| JP | 2017516441 A | 6/2017 | | |
| KR | 20110094534 A | 8/2011 | | |

(Continued)

*Primary Examiner* — Julian D Huffman
(74) *Attorney, Agent, or Firm* — David B. Kelley; Carlson, Gaskey & Olds, P.C.

(57) ABSTRACT

A bidirectional energy transfer system includes a cordset of a bidirectional energy transfer system that transfers power from a device to at least one battery array within a traction battery of an electrified vehicle when the cordset is operating under a first condition, and that transfers power from the at least one battery array to the device when the cordset is operating under a second condition. The cordset can include relays powered by the at least one battery array when the cordset is operating under the second condition.

19 Claims, 3 Drawing Sheets

(56)        References Cited

FOREIGN PATENT DOCUMENTS

| KR | 101191137 B1 | 11/2012 |
| KR | 101654714 B1 | 9/2016 |
| KR | 20160149199 A | 12/2016 |
| KR | 101717082 B1 | 3/2017 |
| KR | 20180128537 A | 12/2018 |
| KR | 101949137 B1 | 2/2019 |
| KR | 20190081921 A | 7/2019 |
| KR | 20200099935 A | 8/2020 |
| KR | 20210001181 A | 1/2021 |

* cited by examiner

BIDIRECTIONAL ENERGY TRANSFER SYSTEM AND METHOD UTILIZING A CORDSET

TECHNICAL FIELD

This disclosure relates generally to a cordset that can be used to charge a traction battery of an electrified vehicle under first operating conditions, and can be used to transfer power from the traction battery under different second operating conditions.

BACKGROUND

Electrified vehicles differ from conventional motor vehicles because they are selectively driven by one or more traction battery pack powered electric machines. The electric machines can propel the electrified vehicles instead of, or in combination with, an internal combustion engine.

Plug-in type electrified vehicles include one or more charging interfaces for charging the traction battery pack. Cordsets can be used to transfer power to the electrified vehicle that charges battery arrays within the traction battery pack.

SUMMARY

In some aspects, the techniques described herein relate to a bidirectional energy transfer system, including: a cordset of a bidirectional energy transfer system that transfers power from a device to at least one battery array within a traction battery of an electrified vehicle when the cordset is operating under a first condition, and that transfers power from the at least one battery array to the device when the cordset is operating under a second condition; and a plurality of relays of the cordset, the plurality of relays powered by the at least one battery array when the cordset is operating under the second condition.

In some aspects, the techniques described herein relate to a bidirectional energy transfer system, wherein the cordset is a portable cordset.

In some aspects, the techniques described herein relate to a bidirectional energy transfer system, wherein the cordset includes a connector that operably couples to the device and a charge port connector that operably couples to a charge port of the electrified vehicle.

In some aspects, the techniques described herein relate to a bidirectional energy transfer system, wherein, under the second condition, power received by the cordset from the electrified vehicle has been converted from DC to AC by an inverter of the electrified vehicle.

In some aspects, the techniques described herein relate to a bidirectional energy transfer system, wherein the device includes an AC infrastructure.

In some aspects, the techniques described herein relate to a bidirectional energy transfer system, wherein the device includes a residential home.

In some aspects, the techniques described herein relate to a bidirectional energy transfer system, including: a cordset that transfers power from a device to at least one battery array within a traction battery of an electrified vehicle when the cordset is operating under a first condition, and that transfers power from the at least one battery array to the device when the cordset is operating under a second condition, wherein, under the second condition, power received by the cordset from the at least one battery array has been converted from DC to AC by an inverter of the electrified vehicle.

In some aspects, the techniques described herein relate to a bidirectional energy transfer system, further including the inverter of the electrified vehicle, the inverter converting DC power to AC power that is provided to the cordset when the cordset is operating under the second condition.

In some aspects, the techniques described herein relate to a bidirectional energy transfer system, further including a plurality of relays powered by power from the at least one battery array when the cordset is operating under the second condition.

In some aspects, the techniques described herein relate to a bidirectional energy transfer system, further including a plurality of switches powered by power from the at least one battery array when the cordset is operating under the second condition.

In some aspects, the techniques described herein relate to a bidirectional energy transfer system, wherein the switches are solid state switches.

In some aspects, the techniques described herein relate to a bidirectional energy transfer system, wherein the cordset is a portable cordset.

In some aspects, the techniques described herein relate to a bidirectional energy transfer system, wherein the cordset includes a connector that operably couples to the device and a charge port connector that operably couples to a charge port of the electrified vehicle.

In some aspects, the techniques described herein relate to a bidirectional energy transfer system, wherein the device includes an AC infrastructure.

In some aspects, the techniques described herein relate to a bidirectional energy transfer system, wherein the device includes a residential home.

In some aspects, the techniques described herein relate to a bidirectional energy transfer method, including: operating a cordset under a first operating condition where the cordset receives power from a device and transfers the power to an electrified vehicle to charge at least one battery array within a traction battery of the electrified vehicle; and operating the cordset under a second operating condition where the cordset receives power from the at least one battery array and transfers the power to the device, the power received by the cordset is AC power that is converted from DC by an inverter of an electrified vehicle.

In some aspects, the techniques described herein relate to a bidirectional energy transfer method, further including using power from the at least one battery array to power a plurality of relays of the cordset when the cordset is operating under the second operating condition.

In some aspects, the techniques described herein relate to a bidirectional energy transfer method, further including injecting noise to detect a state of the device.

In some aspects, the techniques described herein relate to a bidirectional energy transfer method, wherein the device includes an AC infrastructure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary bidirectional power transfer systems and methods that utilize cordsets for bidirectional power transfer.

In particular, the cordset can be used to provide bidirectional energy transfer events between electrified vehicles and other devices or structures, such as for supporting transient loads associated with the devices/structures. In exemplary embodiments, the same cordset that is used to transfer energy from a structure to a vehicle under first operating conditions can be used to transfer energy from the vehicle to the device under second operating conditions. When energy is transferred from the vehicle to the device, an inverter of the vehicle can be used to convert the energy from DC to AC.

Figures 1, 2:
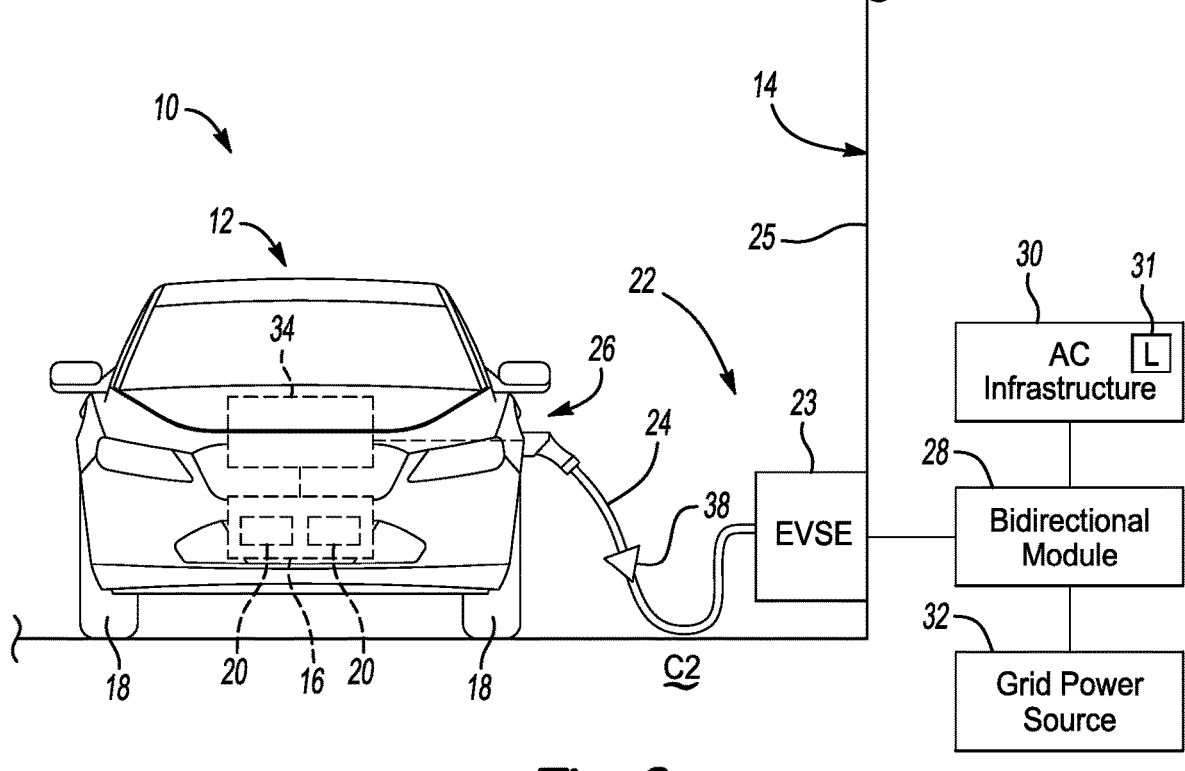
FIG. 1 schematically illustrates a first configuration of a bidirectional energy transfer system.
FIG. 2 schematically illustrates a second configuration of the bidirectional energy transfer system of FIG. 1.

FIGS. 1 and 2 schematically illustrate an exemplary bidirectional energy transfer system 10 (hereinafter "the system 10") for bidirectionally transferring energy between an electrified vehicle 12 and a structure 14. The system 10 enables the bidirectional transfer of energy from the electrified vehicle 12 to the structure 14, or vice versa. The structure 14 may be a residential building, a commercial building, a parking garage, a charging station, or any other type of structure that is capable of receiving or transferring energy. In an embodiment, the structure 14 is a garage of a residential home that functions as a "home location" of the electrified vehicle 12.

Although a specific component relationship is illustrated in the figures of this disclosure, the illustrations are not intended to limit this disclosure. The placement and orientation of the various components of the depicted system are shown schematically and could vary within the scope of this disclosure. In addition, the various figures accompanying this disclosure are not necessarily drawn to scale, and some features may be exaggerated or minimized to emphasize certain details of a particular component.

In an embodiment, the electrified vehicle 12 is a plug-in type electrified vehicle (e.g., a plug-in hybrid electric vehicle (PHEV) or a battery electric vehicle (BEV)). The electrified vehicle 12 includes a traction battery pack 16 that is part of an electrified powertrain capable of applying a torque from an electric machine (e.g., an electric motor) for driving drive wheels 18 of the electrified vehicle 12. Therefore, the electrified powertrain of the electrified vehicle 12 may electrically propel the set of drive wheels 18 either with or without the assistance of an internal combustion engine.

The electrified vehicle 12 of FIGS. 1 and 2 is schematically illustrated as a car. However, other vehicle configurations are also contemplated. The teachings of this disclosure may be applicable for any type of vehicle as the electrified vehicle 12. For example, the electrified vehicle 12 could be configured as a car, a truck, a van, a sport utility vehicle (SUV), etc.

Although shown schematically, the traction battery pack 16 may be configured as a high voltage traction battery pack that includes a plurality of battery arrays 20 (i.e., battery assemblies or groupings of battery cells) capable of outputting electrical power to one or more electric machines of the electrified vehicle. Other types of energy storage devices and/or output devices may also be used to electrically power the electrified vehicle 12.

The electrified vehicle 12 may interface with the structure 14 through Electric Vehicle Supply Equipment (EVSE) 22 to facilitate bidirectional energy transfers. In an embodiment, the EVSE 22 includes a wall box 23 mounted to a wall 25 of the structure 14. The EVSE 22 further includes a cordset 24, which can operably connect the wall box 23 of the EVSE 22 to a charge port assembly 26 of the electrified vehicle 12. The cordset 24 can be used to transfer energy between the electrified vehicle 12 and the structure 14. The cordset 24 can be configured to provide any level of charging (e.g., Level 1 AC charging, Level 2 AC charging, DC charging, etc.).

The EVSE 22 may be operably connected to an AC infrastructure 30 of the structure 14 through a bidirectional energy transfer module 28. Although shown separately from the EVSE 22 in FIG. 1, the bidirectional energy transfer module 28 and the EVSE 22 could be integrated together as part of common module.

Various electrical loads 31, such as household appliance loads, for example, may be associated with the AC infrastructure 30. The electrical loads 31 may sometimes be referred to as transient loads of the AC infrastructure 30 and could include loads associated with common kitchen appliances, washers, dryers, water heaters, air conditioning units, thermostats, household lighting, etc.

Power from a grid power source 32 (e.g., AC power, solar power, wind power, or combinations thereof) and/or power from the electrified vehicle 12 may be selectively communicated to the bidirectional energy transfer module 28. The bidirectional energy transfer module 28 is configured to aid the bidirectional transfers of electrical energy between the electrified vehicle 12 and the structure 14. The bidirectional energy transfer module 28 may include various equipment, including but not limited to an AC/DC converter, a common HVDC bus, an isolation transformer, a DC/DC converter, a control module, etc. for configuring the structure 14 to either receive electrical energy from the electrified vehicle 12 for supporting the electrical loads 31 or send electrical energy to the electrified vehicle 12 for charging the traction battery pack 16. The bidirectional energy transfer module 28 may further be configured to transfer energy from the grid power source 32 to the AC infrastructure 30.

The electrified vehicle 12 may include a bidirectional power transfer system 34 configured for further enabling the bidirectional transfer of power between the electrified vehicle 12 and the structure 14. The bidirectional power transfer system 34 may be operably connected between the charge port assembly 26 and the traction battery pack 16 of the electrified vehicle 12. The bidirectional power transfer system 34 may include various equipment, such as a charger, an inverter, a controller (which may be referred to as an inverter system controller or ISC), etc. for configuring the electrified vehicle 12 for either receiving electrical energy from the structure 14 or communicating electrical energy to the structure 14. The inverter of the bidirectional power transfer system can be used to convert DC power from the battery arrays 20 to DC power that is suitable for powering the AC infrastructure 30.

One non-limiting example of a suitable bidirectional power transfer system that may be employed for use within the electrified vehicle 12 for achieving bidirectional power transfers is disclosed within US Patent Publication No.

2020/0324665, assigned to Ford Global Technologies, LLC, the disclosure of which is incorporated herein by reference. However, other bidirectional power transfer systems could also be utilized for achieving the bidirectional power transfers within the scope of this disclosure.

FIG. 1 schematically illustrates a first configuration C1 of the system 10. During the first configuration C1, power may be transferred from the structure 14 to the electrified vehicle 12, such as for charging the traction battery pack 16 of the electrified vehicle 12. The direction of energy transfer during the first configuration C1 is schematically depicted by arrow 36.

FIG. 2 schematically illustrates a second configuration C2 of the system 10. During the second configuration C2, power may be transferred from the traction battery pack 16 of the electrified vehicle 12 to the structure 14. The direction of energy transfer during the second configuration C2 is schematically illustrated by arrow 38. In this way, the electrified vehicle 12 may be employed as a backup energy storage system for at least partially powering the electrical loads 31 of the structure 14, such as when power from the grid power source 32 is temporarily unavailable as a result of electrical blackouts, for example.

The system 10 may further be configured to transfer energy from the electrified vehicle 12 to the structure 14 for at least partially powering the electrical loads 31 during demand charge conditions of the grid power source 32. Demand charge conditions are conditions in which the utility service provider adds increases the charges associated with receiving energy from the grid power source 32 during peak usage times. The system 10 may therefore provide automated solutions for allowing users to limit or even avoid surcharges associate with demand charge conditions by offsetting grid usage with power from the electrified vehicle 12 during the demand charge conditions. These and other aspects of the system 10 are further detailed below.

Figure 3:
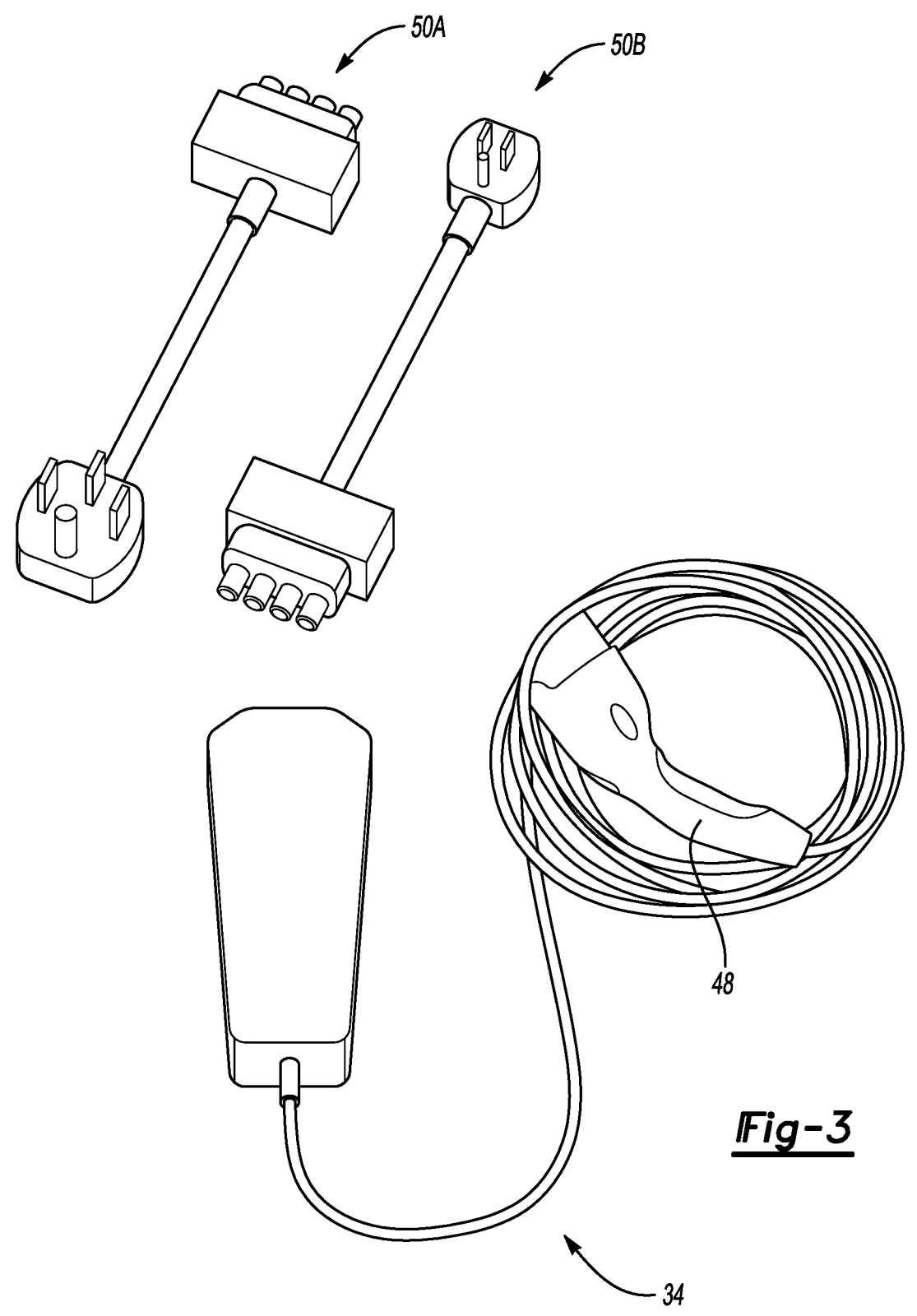
FIG. 3 illustrates a perspective view of a cordset from the system of FIGS. 1 and 2.

FIG. 3 illustrate the cordset 24. The cordset 24 includes a charge port connector 48 that can engage a charge port of the vehicle 12 to operatively couple the cordset 24 to the vehicle 12. The cordset 24 can deliver power through a 240V connector 50A or a 120V connector 50B as desired. The connectors 50A and 50B can plug into an electrical outlet to operably couple the cordset to the AC infrastructure 30, and the grid power source 32 of FIGS. 1 and 2. The cordset 24 is portable. A user can store the cordset 24 in the vehicle 12 when not in use.

Figure 4:
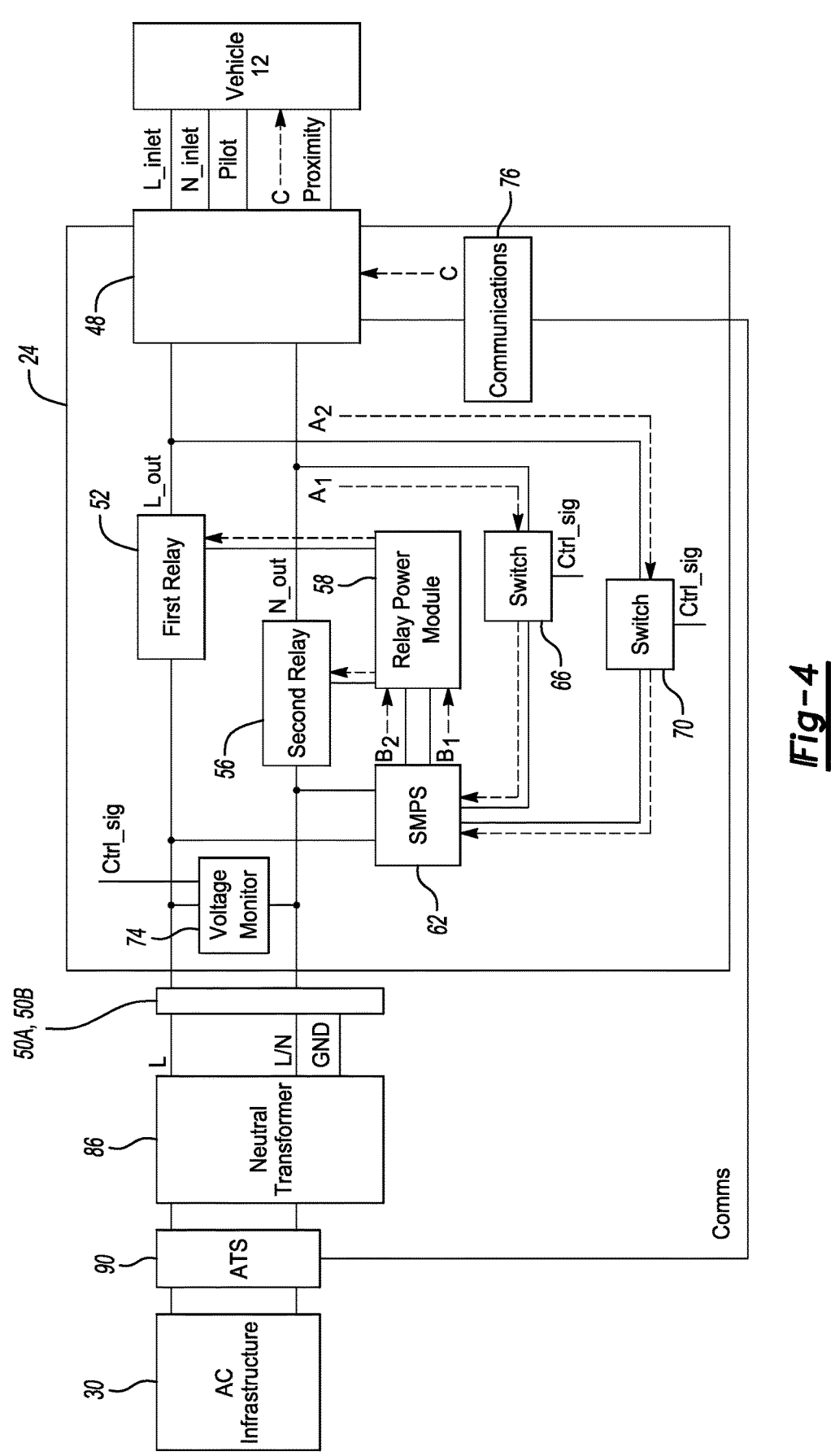
FIG. 4 schematically illustrates the cordset of FIG. 3.

Referring now to FIG. 4 with continuing reference to FIGS. 1-3, the cordset 24 can be used by the system 10 to coordinate bidirectional energy transfer events between the electrified vehicle 12 and the AC infrastructure 30 to, for example, support the electrical loads 31, for example.

In addition to the charge port connector 48 and the connector 50A or 50B, the example cordset 24 includes a first relay 52, a second relay 56, a relay power module 58, a Switched-Mode Power Supply (SMPS) 62, a first switch 66, a second switch 70, a voltage monitor 74, and a communications module 76.

The wall box 23 includes a neutral transformer 86 and automatic transfer switch (ATS) 90. Power that is transferred through the connector 50A or 50B moves through neutral transformer 86 and the ATS 90 before reaching the AC infrastructure 30.

Notably, when the cordset 24 is used to transfer power from the battery arrays 20 of the vehicle 12 to the AC infrastructure 30, AC power from the battery arrays 20 can be used to power the cordset 24. Thus, no separate battery is required.

The AC power from the battery arrays 20, in particular, can power the first relay 52 and the second rely 52 so that the first relay 52 and the second relay 56 transition to a closed state. When the first relay 52 and the second rely 52 are closed, power from the battery arrays 20 can transfer through the cordset 24 to the AC infrastructure 30.

In particular, AC power provided to the cordset 24 from the battery arrays 20 of the vehicle 12 can wake the cordset 24 from an unpowered state. After waking, the cordset 24 can perform arbitration (functional checks and handshaking with the vehicle) to determine if power transfer through the cordset 24 from the battery arrays 20 to the AC infrastructure 30 is possible. If so, the cordset 24, again powered by the battery arrays 20, closes the first relay 52 and the second relay 56. If the cordset 24 is in a faulted state, the vehicle 12 can stop transmitting power to the cordset 24.

The first switch 66 and the second switch 70 can be solid state switches. The first switch 66 and the second switch 70 are normally closed. The first switch 66 and the second switch 70 can be powered from the battery arrays 20. In particular, the voltage monitor 74 of the cordset 24 can sense whether or not AC power is active on AC infrastructure 30 when the cordset 24 is powered up. If the voltage monitor 74 senses that AC power is active on the AC infrastructure 30, a control signal can command open the ATS 90. This can prevent AC power from backfeeding from the AC infrastructure 30 to the cordset 24. Various communication protocols (e.g., wireless, etc.) can be utilized to switch circuits such as the ATS 90.

The cordset 24 can control voltage when the battery arrays 20 are powering the AC infrastructure 30 through the cordset 24. The cordset 24 can control current when power from the AC infrastructure 30 is used to charge the vehicle 12 through the cordset 24.

In some examples, the cordset 24 can communicate with the vehicle 12 via various wireless communication protocols (Bluetooth, Wi-Fi, BLE over IP, etc.) as well as through hardwire connections to the pilot line via LIN or PLC (or both LIN & PLC combination).

In a specific example, a type of ground impedance detection (e.g., noise injection to the ground line, etc.) can be utilized to control the first switch 66 and the second switch 70. The detection can include measuring sense response frequency, which can eliminate the need to power up a device to establish a connection.

As to the connection between the transformer 86 and the cordset 24, if resistance between ground and neutral line show infinite resistance, an open connection can be inferred. If resistance between ground and neutral show less than 1kΩ, then the cordset 24 can infer that a connection between the cordset 24 and the AC infrastructure 30 has been established, which enables charging via the cordset 24.

When the cordset 24 is used to transfer power from the vehicle 12 to the AC infrastructure 30, the power can be transmitted along path A1 from the N_out, through the first switch 66 to the SMPS 62. Additionally, power flows along path A2 from the L_out, through the second switch 70, to the SMPS 62. The first relay 52 and the second relay 56 are powered by the SMPS 62 along the paths B1 and B2 respectively. Through the pilot path C, the cordset 24 can communicate information to the vehicle 12 indicating a maximum current that the cordset 24 can accept.

After the cordset 24 has verified communication with the vehicle 12 and is ready for power transfer, first relay 52 and the second relay 56 can be closed, which will enable AC power to pass through the cordset 24 to the AC infrastructure 30.

The cordset 24 can then conduct a GMI (ground monitoring interrupter) check to verify that there is a low impedance ground connection. This can help to verify that the connector 50A or 50B are properly connected. The cordset 24 may periodically conduct the GMI check to make sure that the connector 50A or 50B maintains the proper connection (i.e., has not been disconnected).

With the connector 50A or 50B connected, a user will be able to maintain power to the AC infrastructure 30, such as a residential home, on one phase to keep critical appliances working like a refrigerator or furnace.

In some examples, the cordset 24 can detect when the AC infrastructure 30 may need power from the vehicle 12. For example, the grid that ordinarily provides power to the AC infrastructure 30 could be experiencing a power outage. In an example, the cordset 24 can detect this (without feedback from the grid) using noise injection.

For example, from the cordset 24, noise can be injected through line N (neutral) and line GRD (ground). The cordset 24 can have an embedded resistance measuring circuit (e.g. voltage drop) to determine grid state. If resistance is measured as infinite, then the cordset 24 can infer that there is no connection. In response, the cordset 24 can open the circuit and disable controls for bidirectional power transfer. If resistance <1kΩ, then the cordset 24 can infer that a connection is established, but the grid is down. As a result, the cordset 24 can proceed with protocols to have the vehicle 12 supply power to the AC infrastructure 30 through the cordset 24.

The cordset 24 can be used to transfer power from the battery arrays to facilitate peak shaving offsets/load offset (grid-tied). The cordset 24 can be used to transfer power from the battery arrays 20 as well as power outage support when the grid goes down with less equipment.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A bidirectional energy transfer system, comprising:
a cordset of a bidirectional energy transfer system that transfers power from a device to at least one battery array within a traction battery of an electrified vehicle when the cordset is operating under a first condition, and that transfers power from the at least one battery array to the device when the cordset is operating under a second condition;
a plurality of relays of the cordset, the plurality of relays powered by the at least one battery array when the cordset is operating under the second condition; and
a plurality of switches of the cordset, the plurality of switches powered by the at least one battery array when the cordset is operating under the second condition,
wherein, under the second condition, power received by the cordset from the electrified vehicle has been converted from DC to AC by an inverter of the electrified vehicle.

2. The bidirectional energy transfer system of claim 1, wherein the cordset is a portable cordset.

3. The bidirectional energy transfer system of claim 1, wherein the cordset includes a connector that operably couples to the device and a charge port connector that operably couples to a charge port of the electrified vehicle.

4. The bidirectional energy transfer system of claim 1, wherein the device comprises an AC infrastructure.

5. The bidirectional energy transfer system of claim 1, wherein the device comprises a residential home.

6. A bidirectional energy transfer system, comprising:
a cordset that transfers power from a device to at least one battery array within a traction battery of an electrified vehicle when the cordset is operating under a first condition, and that transfers power from the at least one battery array to the device when the cordset is operating under a second condition,
wherein, under the second condition, power received by the cordset from the at least one battery array has been converted from DC to AC by an inverter of the electrified vehicle;
a plurality of relays of the cordset, the plurality of relays powered by power from the at least one battery array when the cordset is operating under the second condition; and
a plurality of switches of the cordset, the plurality of switches powered by power from the at least one battery array when the cordset is operating under the second condition.

7. The bidirectional energy transfer system of claim 6, further comprising the inverter of the electrified vehicle, the inverter converting DC power to AC power that is provided to the cordset when the cordset is operating under the second condition.

8. The bidirectional energy transfer system of claim 6, wherein the switches are solid state switches.

9. The bidirectional energy transfer system of claim 6, wherein the cordset is a portable cordset.

10. The bidirectional energy transfer system of claim 6, wherein the cordset includes a connector that operably couples to the device and a charge port connector that operably couples to a charge port of the electrified vehicle.

11. The bidirectional energy transfer system of claim 6, wherein the device comprises an AC infrastructure.

12. The bidirectional energy transfer system of claim 6, wherein the device comprises a residential home.

13. A bidirectional energy transfer method, comprising:
operating a cordset under a first operating condition where the cordset receives power from a device and transfers the power to an electrified vehicle to charge at least one battery array within a traction battery of the electrified vehicle;
operating the cordset under a second operating condition where the cordset receives power from the at least one battery array and transfers the power to the device, the power received by the cordset is AC power that is converted from DC by an inverter of an electrified vehicle;
using power from the at least one battery array to power a plurality of relays of the cordset when the cordset is operating under the second operating condition; and
using power from the at least one battery array to power a plurality of switches of the cordset when the cordset is operating under the second operating condition.

14. The bidirectional energy transfer method of claim 13, further comprising injecting noise to detect a state of the device.

15. The bidirectional energy transfer method of claim 13, wherein the device comprises an AC infrastructure.

16. The bidirectional energy transfer system of claim 1, further comprising a switched-mode power supply of the cordset, wherein, when the cordset is operating under the second condition, the switched-mode power supply receives power from the plurality of switches, and sends power to the plurality of relays.

17. The bidirectional energy transfer system of claim 6, further comprising a switched-mode power supply of the cordset, wherein, when the cordset is operating under the second condition, the switched-mode power supply receives power from the plurality of switches, and sends power to the plurality of relays.

18. The bidirectional energy transfer method of claim 13, further comprising, when the cordset is operating under the second operating condition, passing power from the plurality of switches through a switched-mode power supply of the cordset to the plurality of relays.

19. The bidirectional energy transfer method of claim 13, further comprising controlling voltage and current with the cordset when the cordset is operating under the second operating condition.

\* \* \* \* \*